May 17, 1966  J. R. CAWLEY  3,251,629
MATERIAL STRIPPING MACHINE
Filed Dec. 31, 1962  2 Sheets-Sheet 1
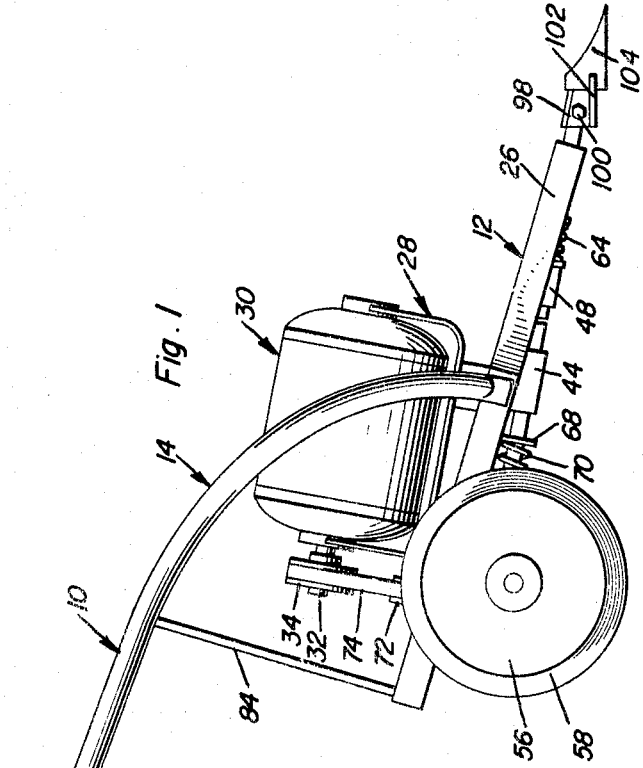
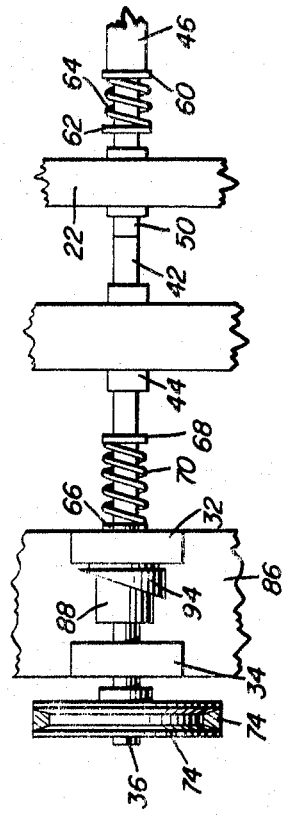
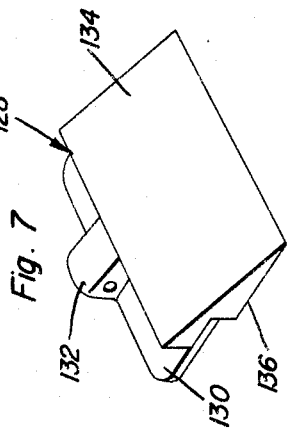
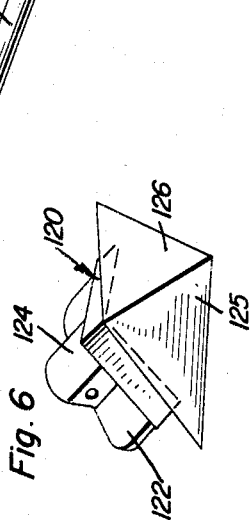
James R. Cawley
INVENTOR.

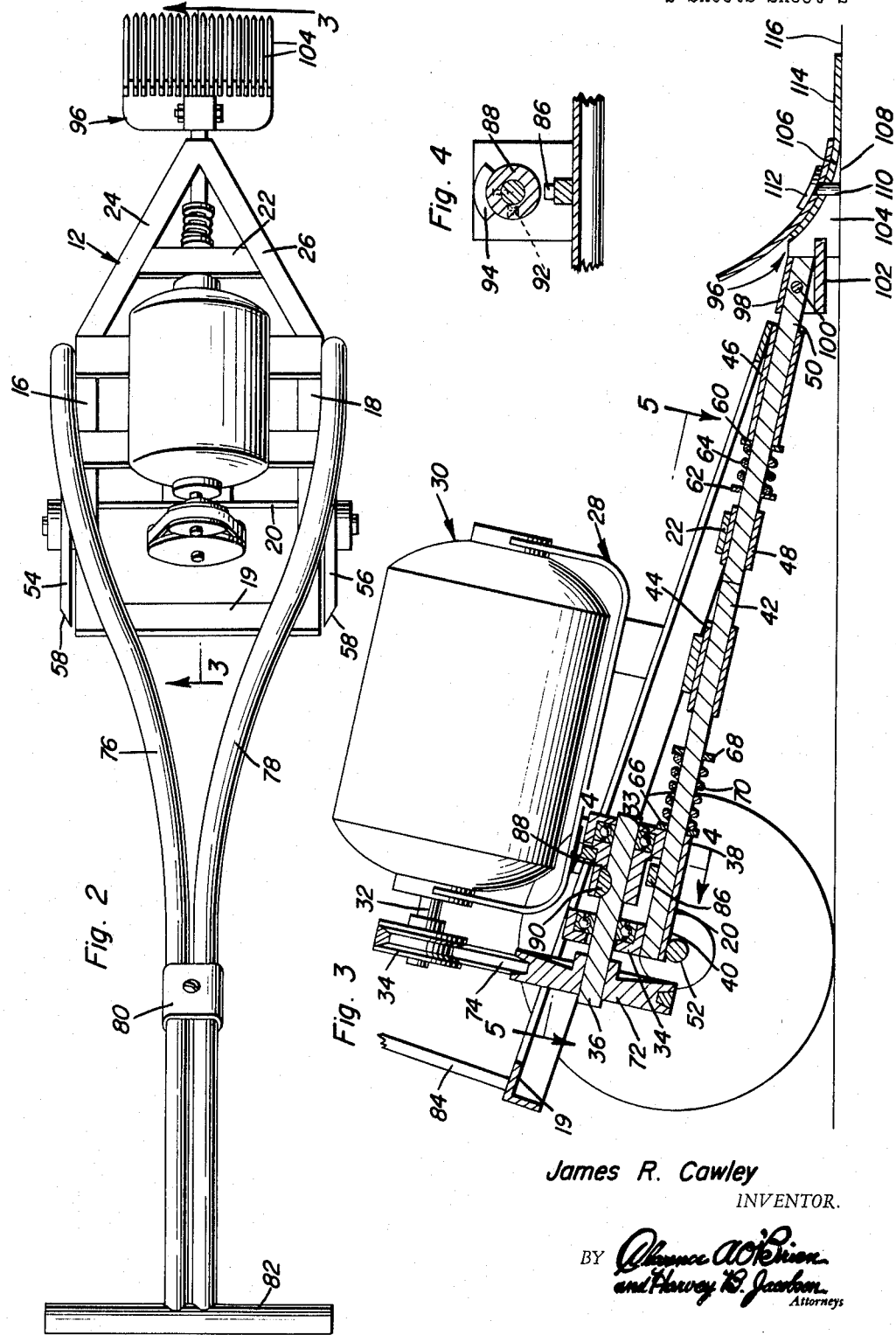

United States Patent Office 3,251,629
Patented May 17, 1966

3,251,629
MATERIAL STRIPPING MACHINE
James R. Cawley, Houston, Tex., assignor of fifty percent to William B. Terry, Houston, Tex.
Filed Dec. 31, 1962, Ser. No. 248,508
6 Claims. (Cl. 299—37)

This invention relates to a novel and useful material stripping machine and more specifically to a machine which is designed so as to be adapted primarily for the purpose of stripping sections of covering material secured by bonding or fastener methods to various types of supporting surfaces.

Although the material stripping machine of the instant invention is particularly well adapted for the purpose of removing roofing shingles, floor tile and linoleum, the machine may also be used for stripping other sections of covering material.

The material stripping machine includes an elongated force member which is mounted for longitudinal reciprocation and which is provided with wedge means on one end adapted to wedge between the sections to be removed and the surface from which they are being removed. The machine further includes an impact member which is also mounted for reciprocation on the frame of the machine and whose path of reciprocation generally parallels and is aligned with the path of reciprocation of the force member. The force member is spring mounted and yieldingly urged in a direction retracting the wedge means carried thereby and the abutment member is yieldingly urged into a position in abutting engagement with the end of the force member remote from the wedge means. A motor is provided including cam-type drive means operatively connecting the motor to the impact member for intermittingly urging the impact member against the force of its spring away from abutting engagement with the force member and then releasing the abutment member whereby its spring means will urge it sharply into abutting engagement with the force member advancing the end thereof having the wedge means secured thereto. Accordingly, it may be seen that the principle of operation of the material stripping machine is somewhat like that of an impact hammer.

The main object of this invention is to provide a material stripping machine for stripping sections of covering material secured by bonding or fastener methods to supporting surfaces which will be capable of quickly removing substantially all types of sections of covering material.

A further object of this invention, in accordance with the immediately preceding object, is to provide a material stripping machine including a reciprocable force member having wedge means removably mounted thereon whereby the wedge means may be readily changed so as to adapt the machine for carrying out numerous stripping operations.

Another object of this invention is to provide a machine in accordance with the preceding objects which is portable and which may be powered by conventional methods thereby enabling the machine to be used in numerous environments.

A final object of this invention to be specifically enumerated herein is to provide a machine in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the machine of the instant invention;

FIGURE 2 is a top plan view of the embodiment illustrated in FIGURE 1;

FIGURE 3 is an enlarged fragmentary longitudinal vertical sectional view taken substantially upon the plane indicated by the section line 3—3 of FIGURE 2;

FIGURE 4 is a fragmentary transverse vertical sectional view taken substantially upon the plane indicated by the section line 4—4 of FIGURE 3;

FIGURE 5 is a fragmentary horizontal sectional view taken substantially upon the plane indicated by the section line 5—5 of FIGURE 3;

FIGURE 6 is a perspective view of a modified form of wedge means to be used in conjunction with the stripping machine; and FIGURE 7 is a perspective view of a still further form of wedge means.

Referring now more specifically to the drawings the numeral 10 generally designates the machine of the instant invention which may be seen to include a main frame generally referred to by the reference numeral 12 and a handle assembly generally referred to by the reference numeral 14.

The main frame 12 includes a pair of longitudinally extending opposite side members 16 and 18 which are interconnected at their rear ends by means of a tranverse brace 19, at their mid-portions by means of a transverse brace 20 and at their forward ends by means of a transverse brace 22. It will be noted that the forward end portions 24 and 26 of the side members 16 and 18, respectively, are forwardly convergent and are joined together in any convenient mannear at their forward ends.

A motor mount assembly generally referred to by the reference numeral 28 also interconnects the opposite side members 16 and 18 and supports an electric motor generally referred to by the reference numeral 30 which includes an output shaft 32 having a driving pulley 34 mounted thereon.

The transverse brace 20 includes a pair of bearing journals 33 and 34 which rotatably journal the forward end rear ends of a cam shaft 36. In addition, the journals 33 and 34 also define sleeve bearings 38 and 40, respectively, which slidingly receive the rear end of an elongated rod-like abutment member 42. The motor mount or frame 28 also includes a sleeve bearing 44 which slidingly receives the forward end of the abutment member 42.

A sleeve journal 46 is supported from the apex of the main frame 12 defined by the forward ends of the forward end portions 24 and 26 and a sleeve journal 48 is supported from the transverse member 22. The sleeve journals 46 and 48 slidingly receive the front and rear portions of an elongated rod-like force member 50.

An axle 52 is secured to the undersurface of the transverse member 20 and has a pair of ground-engaging wheels 54 and 56 rotatably journaled on its opposite ends. The wheels 54 and 56 are beveled as at 58 so as to define a pair of sharpened disks.

An abutment washer 60 is secured to the rear end of the sleeve journal 46 and an abutment washer 62 is secured to the force member 50 intermediate the sleeve journals 46 and 48. A compression spring 64 is disposed about the force member 50 and between the abutment washers 60 and 62. In addition, it may be seen that an abutment washer 66 is secured to the forward end of the sleeve journal 38 and that an abutment washer 68 is secured to the abutment member 42 intermediate the sleeve journal 38 and the sleeve bearing 44. A compression spring 70 is disposed about the abutment member 42 and between the abutment washers 66 and 68.

Thus, from FIGURE 3 of the drawings it may be seen that the force member 50 is mounted for rectilinear reciprocation between two limit positions and that it is yieldingly urged, by means of the spring 64, toward a rearmost position. On the other hand, it may be seen that the abutment member 42 is yieldingly urged, by means of the spring 70, toward a forwardmost limit position.

The cam shaft 36 has a driven pulley 72 mounted thereon which is aligned with the driving pulley 34 and an endless flexible belt 74 is utilized to drivingly connect the driving pulley 32 to the driven pulley 72.

From a comparison of FIGURES 1 and 2 of the drawings it may be seen that the handle assembly 14 includes a pair of elongated handle members 76 and 78 which are secured at their forward ends to opposite sides of the main frame 12 and to each other at their rear ends by means of a clamp 80 and a handgrip portion 82. Suitable bracing 84 is secured between intermediate portions of the members 76 and 78 and the rear of the frame 12.

A cam follower or abutment 86 is secured to the rear end portion of the abutment member 42 disposed between the sleeve bearings or journals 38 and 40 and a cam sleeve 88 is keyed to the cam shaft 36 by means of a key 90 and a setscrew 92. The cam sleeve 88 includes a cam lobe 94, see FIGURES 4 and 5, which when rotated with the cam shaft 36 interemittently cams the abutment member 42 to the left as viewed in FIGURE 3 of the drawings.

With attention now directed to FIGURES 2 through 4 of the drawings, there may be seen a wedge assembly generally referred to by the reference numeral 96 and including a rearwardly opening sleeve portion 98 that is pivotally secured to the forward end of the force member 50 by means of a pivot pin 100, the forward end of the force member 50 being loosely received in the sleeve 98.

The sleeve 98 comprises a downwardly opening U-shaped member which is secured to a mounting plate 102. The mounting plate 102 has a plurality of forwardly projecting fingers 104 secured thereto which are generally parallel and which define an upwardly facing concave surface 106 and a substantially planar lower surface 108. It will be noted that the spacing between the fingers 104 is sufficient to enable the shank portion 110 of a nail 112 being utilized to secure shingles 114 to the surface 116 to pass between the fingers 104.

With attention now directed to FIGURE 6 of the drawings there will be seen a modified form of wedge means generally referred to by the reference numeral 120 including a mounting plate 122 and a downwardly opening generally inverted U-shaped sleeve portion 124 which is secured to the mounting plate 122 and is similar to the sleeve 98. The wedge means 120 includes a pair of generally planar and angularly disposed rearwardly and upwardly inclined and convergent adjacent plates 125 and 126 which together form a generally V-shaped leading edge having its apex disposed forwardmost.

From FIGURE 7 of the drawings it may be seen a still further modified form of wedge means generally referred to by the reference numeral 128 which also includes a mounting plate 130 having a downwardly opening generally U-shaped sleeve portion 132 secured thereto. The wedge means 128 includes a pair of substantially planar panel members 134 and 136 defining a pair of angularly disposed and adjacent upper and lower surfaces, respectively.

In operation, the motor 30 may be actuated whereby the cam shaft 36 will intermittently bring the cam lug 94 into engagement with the follower or abutment 86. Each time the cam lug 94 engages the follower 86, the abutment member 42 will be drawn rearwardly against the tension of the compression spring 70. Then, when the cam lug 94 passes the abutment 86, the compression spring 70 will sharply urge the abutment member 42 forwardly abutting the forward end thereof against the rear end of the force member 50 and thus imparting forward movement to the abutment member 50. This intermittent forward thrust applied to the wedge means 96 will, of course, enable the wedge means 96 to be advanced under the sections 114 of covering which is secured to the surface 116. Inasmuch as the shanks 110 of the fasteners 112 will pass between the fingers 104, the fasteners 112 will be withdrawn from the surface 116 in the conventional manner such as would be accomplished by means of the claw portion of a claw hammer.

If it is desired, the pivot pin 100 may be removed in order that a selected one of the other wedge means 120 and 128 may be mounted on the forward end of the force member 50 in lieu of the cam means 96.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A material stripping machine for stripping sections of covering material secured by bonding fastener methods to supporting surfaces, said machine comprising a main frame, a rigid elongated force member mounted on said frame for guided longitudinal reciprocation between two limit positions, means yieldably urging said force member in one direction toward one limit position, a rigid elongated impact member mounted on said frame for guided longitudinal reciprocation between two limit positions along a path aligned with the path of reciprocal movement of said force member and with said impact member aligned end to end with said force member, means yieldably urging said impact members in the opposite direction, the adjacent ends of said impact and force members being positioned in abutting engagement, wedge means carried by the end of said force member remote from said impact member adapted to wedge between the sections to be stripped and the surface to which said sections are secured, a cam shaft journaled from said frame for rotation about an axis closely paralleling said impact member, said impact member including a cam follower thereon projecting laterally outwardly therefrom toward said cam shaft, said cam shaft including a cam lobe operable, upon rotation of said cam shaft, to engage said cam follower and intermittently advance the latter in a direction moving said impact member in said one direction out of engagement with said force member and against the thrust of the means urging said impact member in said opposite direction and release said cam follower for return of the latter and said impact member in said one direction by the last-mentioned urging means for impact with said force member to urge the latter in said one direction against said means urging said force member in said other direction, motor means supported from said frame and drivingly connected to said cam shaft, said main frame including ground engaging wheels journaled for rotation about an axis extending transversely of the path of reciprocation of said force member.

2. The combination of claim 1 wherein said wedge means is pivotally secured to said force member for rotation about an axis extending transversely of said force member.

3. The combination of claim 2 wherein said wedge means defines angularly disposed surfaces generally paralleling said axis of rotation.

4. The combination of claim 1 wherein said wedge means includes a plurality of upstanding plate-like generally parallel fingers including inclined generally parallel upper surfaces.

5. The combination of claim 1 wherein said wedge means defines a pair of planar angularly disposed adjacent surfaces.

6. The combination of claim 1 wherein said wedge means defines a pair of upper generally planar angularly disposed adjacent surfaces each inclined relative to an adjacent upper generally parallel lower surface.

References Cited by the Examiner

UNITED STATES PATENTS

| | | | |
|---|---|---|---|
| 645,608 | 3/1900 | Schake | 173—119 |
| 1,222,663 | 4/1917 | Penney | 173—119 |
| 1,798,082 | 3/1931 | Grutzbach | 173—119 |
| 1,887,762 | 11/1932 | Horton | 173—123 X |
| 2,185,052 | 12/1939 | Daugherty | 15—93 X |
| 2,279,454 | 4/1942 | Fischer | 262—8 X |
| 2,465,192 | 3/1949 | Booth | 262—8 |
| 2,565,841 | 8/1951 | Conforto | 299—37 X |
| 2,571,169 | 10/1951 | Shannon | 262—8 |
| 2,906,514 | 9/1959 | Becker | 262—8 |

JACOB L. NACKENOFF, *Primary Examiner.*

BENJAMIN HERSH, *Examiner.*

E. R. PURSER, *Assistant Examiner.*